(12) United States Patent
Qadeer et al.

(10) Patent No.: US 7,316,005 B2
(45) Date of Patent: Jan. 1, 2008

(54) DATA RACE DETECTION USING SEQUENTIAL PROGRAM ANALYSIS

(75) Inventors: Shaz Qadeer, Seattle, WA (US); Dinghao Wu, Princeton, NJ (US)

(73) Assignee: Microsoft Corporation, Redmond, WA (US)

( * ) Notice: Subject to any disclaimer, the term of this patent is extended or adjusted under 35 U.S.C. 154(b) by 682 days.

(21) Appl. No.: 10/765,717

(22) Filed: Jan. 26, 2004

(65) Prior Publication Data

US 2005/0177775 A1    Aug. 11, 2005

(51) Int. Cl.
    *G06F 9/44* (2006.01)
(52) U.S. Cl. .................................... 717/131
(58) Field of Classification Search ........ 717/130–131, 717/124, 136, 139–140; 714/36–39, 791; 718/100, 102, 103
    See application file for complete search history.

(56) References Cited

U.S. PATENT DOCUMENTS

| | | | |
|---|---|---|---|
| 6,289,360 B1* | 9/2001 | Kolodner et al. | 707/206 |
| 6,343,371 B1* | 1/2002 | Flanagan et al. | 717/124 |
| 6,393,440 B1* | 5/2002 | Salant et al. | 707/206 |
| 6,405,326 B1* | 6/2002 | Azagury et al. | 714/38 |
| 6,671,707 B1* | 12/2003 | Hudson et al. | 707/206 |
| 6,779,135 B1* | 8/2004 | Ur et al. | 714/38 |
| 6,817,009 B2* | 11/2004 | Flanagan et al. | 717/126 |
| 6,826,752 B1* | 11/2004 | Thornley et al. | 718/100 |
| 7,028,119 B2* | 4/2006 | Hue | 710/200 |
| 2002/0120428 A1* | 8/2002 | Christiaens | 702/186 |
| 2003/0131283 A1* | 7/2003 | Ur et al. | 714/36 |
| 2004/0123185 A1* | 6/2004 | Pierce et al. | 714/38 |
| 2005/0283781 A1* | 12/2005 | Karp et al. | 718/100 |

OTHER PUBLICATIONS

Vhsnftsdrkhst Noyspsyi, et al., "Ownership Types for Safe Programming: Preventing Data Races and Deadlocks" Nov. 2002, ACM Press, vol. 37 Issue 11, pp. 211-230.*
Stefan Savage, et al., "Eraser: A Dynamic Data Race Detector for Multithreaded Programs", Nov. 1997, ACM Press vol. 15, Issue 4, pp. 391-411.*
Eli Pozniansky, et al., "Efficient On-the-Fly Data Race Detection in Multithreaded C++ Programs", Jun. 2003, ACM Press, vol. 38, Issue 10, pp. 179-190.*
Ball et al., "The SLAM project: debugging system software via static analysis." *Proceedings of the 29th ACM SIGPLAN-SIGACT Symposium on Principles of Programming Languages (POPL '02)*, ACM Press, 2002, 3 pages.

(Continued)

*Primary Examiner*—Wei Zhen
*Assistant Examiner*—Anna Deng
(74) *Attorney, Agent, or Firm*—Klarquist Sparkman, LLP

(57) ABSTRACT

A concurrent program is analyzed for the presence of data races by the creation of a sequential program from the concurrent program. The sequential program contains assertions which can be verified by a sequential program analysis tool, and which, when violated, indicate the presence of a data race. The sequential program emulates multiple executions of the concurrent program by nondeterministically scheduling asynchronous threads of the concurrent program on a single runtime stack and nondeterministically removing the currently-executing thread from the stack before instructions of the program. Checking functions are used to provide assertions for data races, along with a global access variable, which indicates if a variable being analyzed for data races is currently being accessed by any threads.

18 Claims, 11 Drawing Sheets

OTHER PUBLICATIONS

Bouajjani et al., "A generic approach to the static analysis of concurrent programs with procedures." *Proceedings of the 30th ACM SIGPLAN-SIGACT Symposium on Principles of Programming Languages (POPL '03)*, ACM Press, 2003, 12 pages.

Bush et al., "A static analyzer for finding dynamic programming errors." Software-Practice and Experience, 30(7):775-802, Jun. 2000.

Corbett et al., "Bandera: extracting finite-state models from Java source code." *International Conference on Software Engineering*, 2000, pp. 439-448.

Das et al., "ESP: Path-sensitive program verification in polynomial time." *Proceedings of the ACM SIGPLAN 2002 Conference on Programming Language Design and Implementation (PLDI'02)*, ACM Press, 2002, 12 pages.

Das, "Unification-based pointer analysis with directional assignments." *Proceedings of the ACM SIGPLAN 2000 Conference on Programming Language Design and Implementation (PLDI'00)*, ACM Press, 2000, pp. 35-46.

Engler et al., "Checking system rules using system-specific, programmer-written compiler extensions." *Proceedings of the 4th Symposium on Operating Systems Design and Implementation (OSDI'00)*, Usenix Association, 2000, 16 pages.

Flanagan et al., "Thread-modular model checking." *Proceedings of the SPIN Workshop on Software Verification*, 2003, 15 pages.

Havelund et al., Model checking Java programs using Java PathFinder. *Software Tools for Technology Transfer (STTT)*, 2(4):72-84, 2000.

Henzinger et al., "Thread-modular abstraction refinement." *CAV 2003: Computer Aided Verification*, 2003, 13 pages.

Henzinger et al., "Lazy abstraction." *Proceedings of the $29^{th}$ ACM SIGPLAN-SIGACT Symposium on Principles of Programming Languages (POPL '02)*, ACM Press, 2002, 13 pages.

Holzmann, "The Model Checker SPIN." *IEEE Transactions on Software Engineering*, 23(5):279-295, May 1997.

Reps et al., "Precise interprocedural dataflow analysis via graph reachability." *Proceedings of the 22nd ACM SIGPLAN-SIGACT Symposium on Principles of Programming Languages*, ACM, 1995, pp. 49-61.

Robby et al., "Bogor: an extensible and highly-modular software model checking framework." *FSE 2003: Foundations of Software Engineering*, 2003, 10 pages.

Sharir et al., "Two approaches to interprocedural data flow analysis." *Program Flow Analysis: Theory and Applications*, Prentice-Hall, 1981, pp. 189-233.

* cited by examiner

Fig. 7

| | Original Statement | | Instrumented Sequential Code |
|---|---|---|---|
| 705 | $v = c$ | = | $schedule()$; $choice\{skip\ []\ check_w(\&v);\ RAISE\}$; $v = c$ |
| 710 | $v = \&v_1$ | = | $schedule()$; $choice\{skip\ []\ check_w(\&v);\ RAISE\}$; $v = \&v_1$ |
| 715 | $v = *v_1$ | = | $schedule()$;<br>$choice\{skip\ []\ check_r(\&v_1);\ RAISE\ []\ check_r(v_1);\ RAISE\ []\ check_w(\&v);\ RAISE\}$;<br>$v = *v_1$ |
| 720 | $*v = v_1$ | = | $schedule()$;<br>$choice\{skip\ []\ check_r(\&v_1);\ RAISE\ []\ check_r(\&v);\ RAISE\ []\ check_w(v);\ RAISE\}$; $*v = v_1$ |
| 725 | $v = v_1\ op\ v_2$ | = | $schedule()$;<br>$choice\{skip\ []\ check_r(\&v_1);\ RAISE\ []\ check_r(\&v_2);\ RAISE\ []\ check_w(\&v);\ RAISE\}$;<br>$v = v_1\ op\ v_2$ |
| 730 | $atomic\ \{s\}$ | = | $schedule()$; $choice\{skip\ []\ RAISE\}$; $s$ |
| 735 | $v = v_0()$ | = | $schedule()$;<br>$choice\{skip\ []\ check_r(\&v_0);\ RAISE\ []\ check_w(\&v);\ RAISE\}$;<br>$v = v_0()$;<br>$if\ (raise)\ return$ |
| 740 | $async\ v_0()$ | = | $schedule()$;<br>$choice\{skip\ []\ check_r(\&v_0);\ RAISE\}$;<br>$if\ (size() < max)\ put(v_0)$;<br>$else\ \{v_0();\ raise = FALSE\}$ |
| 745 | $return$ | = | $schedule()$; $return$ |

Code Instrumentation Examples

Fig. 8d $v = 5$
$check_w(v); RAISE$

| |
|---|
| q |
| q |
| b |
| b |
| a |
| a |
| a |

$access = 2$

Fig. 8e $schedule(p)$

| |
|---|
| p |
| p |
| q |
| q |
| b |
| b |
| a |
| a |
| a |

$access = 2$

Fig. 8f $m = v$
$check_r(v) = FAIL$

| |
|---|
| p |
| p |
| q |
| q |
| b |
| b |
| a |
| a |
| a |

$access = 2$

Sequentializer 200 and Sequential
Program Analyzer 210

DATA RACE DETECTION USING SEQUENTIAL PROGRAM ANALYSIS

TECHNICAL FIELD

The invention relates generally to analysis of concurrent programs.

BACKGROUND

Data Races

Concurrent programs, also known as multithreaded programs, are found in a wide array of products and services, from software device management to distributed scientific computing. However, the fundamental nature of these programs, the fact that they contain multiple concurrently-executing threads, can cause inter-thread conflicts which can create errors or hanging conditions upon execution. These errors can be particularly difficult to discover when programming because oftentimes more than one asynchronously-running thread is run on a single processor. The instructions of the threads are interleaved, giving rise to a potentially large number of different executions. Because of this, an important, and difficult, part of the debugging and analysis of a concurrent program involves finding potential conflicts between threads.

One of these conflicts is known as a data race. Generally, a data race is a condition where there exists an execution of two or more threads such that the executing computer can arrive at a state for which a) there are two threads which can execute, b) both of these threads access a common variable, and c) at least one of the accesses is a write access.

FIGS. 1a-1d illustrate two types of data race conditions which can lead to unpredictable results. Avoiding these unpredictable results is the goal of the program analysis discussed below. FIGS. 1a and 1b illustrate one type of data race, that of conflicting read and write instructions from two different threads. In both Figures, there are two concurrently-executing threads which access a common variable, referred to here as "a," which starts with value 0. The Figures illustrate two different executions of the instructions of Threads 1 and 2. A data race occurs in this example when a computer executing these threads reaches a state at which either of the two executions illustrated could execute. Other than the differing orders, described below, the variable accesses in the Figures are the same.

In FIG. 1a, Thread 1, which contains the assignment instruction "q=a," reads the value of a as 0 and then assigns that value to the variable q. After this point in time, Thread 2 then executes the instruction "a=1" which assigns the value 1 to a. Thus, at the end of the execution of FIG. 1a, a has the value 1 and q has the value 0. In contrast, FIG. 1b illustrates a different execution in which Thread 2 writes to variable a before Thread 1 reads from it. In this case, because a is assigned a value by Thread 2 before Thread 1 is able to read a, q ends up with the value 1. Thus, the two executions illustrated in FIGS. 1a and 1b give two different results for q.

FIGS. 1c and 1d illustrate another type of data race, that of conflicting write instructions. As in FIGS. 1a and 1b, FIGS. 1c and 1d illustrate different executions of instructions from two concurrently-executing threads. In FIG. 1c, Thread 1 executes the instruction "a=0" before Thread 2 executes "a=1," which results in a having the final value of 1. In contrast, FIG. 1d illustrates the two write commands executing in a differing order, giving a a final value of 0.

The illustrated examples of FIGS. 1a-d demonstrate that executions of concurrently-executing threads can cause different values to be placed in certain variables, which can cause a program to behave unpredictably or to fail to execute. Oftentimes, these errors are solved by forcing the competing threads to execute synchronously, which means forcing the threads to operate under a common timing or locking mechanism. The use of synchronous threads allows a programmer to decide ahead of time that certain instructions cannot interfere with each other and to make allowances for that by modifying the programming. However, in order to utilize synchronicity, data races such as those illustrated in FIGS. 1a-1d must be located.

Locating Data Races

Because data races are so timing-dependent, and may occur under only certain precise conditions, searching for them in a program can be a difficult, time-consuming process. Some existing systems for data race detection, such as model checking, attempt to statically explore every possible execution of a concurrent program by considering every possible thread interleaving. Because this analysis is done statically, it can be done at compile time without requiring execution of the analyzed program. While these systems are sound, that is, they find every possible error, they may report false errors by identifying data races from interleavings of instructions that cannot or will not happen. By contrast, some existing systems analyze concurrent programs dynamically by executing the program and observing its operation. These dynamic systems cannot guarantee to locate every data race, however, and may report false errors.

While traditional static data race analysis is more sound than dynamic analysis, it suffers from a number of disadvantages. Traditional static analysis can require the addition of programmer annotations, which increases debugging time. Additionally, because the execution time of such an analysis grows exponentially with the number of threads in the concurrent program, the time required to perform such an analysis can be prohibitively expensive. In certain circumstances, such an analysis may never complete; it has been proven that the general problem of detecting data races in multithreaded programs is undecideable. That is, no program can exist which can correctly identify every data race in every concurrent program in a finite period of time.

In contrast, analysis on single-threaded, or sequential, programs has been shown to be decideable. Thus a number of existing products have been developed and optimized to perform static analysis on sequential programs. One such tool is the SLAM system, discussed in "Proceedings of the $29^{th}$ ACM SIGPLAN-SIGACT Symposium on Principles of Programming Languages" (ACM Press 2002). Tools such as SLAM are widely available, useful to programmers, and have been tested and optimized to provide efficient analysis. As an example, many of these systems are optimized to efficiently check on single variables and to ignore accesses in an analyzed program that are unrelated to a target variable. While these optimized tools would be useful for data race checking, they have traditionally not been helpful to programmers of concurrent systems because of the undecidability and time-cost of analyzing concurrent programs. What is needed is a system that would allow developers of concurrent programs to take advantage of the efficiency of existing sequential analysis tools when searching for data races.

SUMMARY

The data race detecting techniques described herein overcome limitations of traditional systems by utilizing sequential program analysis tools to detect data races in concurrent programs. In one implementation, this is done using a program sequentializer module which creates a sequential program from a concurrent program. The sequential program contains assertions which cause an error message to be produced when the concurrent program contains a data race. In another implementation, the data race techniques employ a method which receives a concurrent program and an indication of a target variable to check for data races. The method then creates a sequential program which contains assertions which indicate the presence of a data race for the target variable if they are not met. In yet another implementation, the data race techniques employ a computer-readable medium containing instructions which, when executed, receive a concurrent program and an indication of a target variable to check for data races. The instructions then, when executed, create a sequential program which contains assertions which indicated the presence of a data race for the target variable if they are not met.

BRIEF DESCRIPTION OF THE DRAWINGS

FIG. 7 is a listing of code examples of instrumentation added to a program to allow for data race detection.

FIGS. 8a-8f are block diagrams demonstrating an exemplary operation of a sequential program.

DETAILED DESCRIPTION

1. Illustrated Embodiment

The system and methods described herein are for a sequentializing tool which creates a sequential program from a concurrent one, allowing the program to be analyzed by a static sequential program analyzer. The system and methods allow for a substantially-sound static analysis of a concurrent program identifying potential data races in a program. Examples of variables for which data races may be identified include, but are not limited to, resource access flags or semaphores, data variables, file streams, and database entries. Additionally, the system and methods allow for the use of optimized program analysis tools, allowing for a more-efficient analysis than with traditional static model-checking routines. The system does this by adding global variables and additional instrumentation to the concurrent program, resulting in a sequential program that nondeterministically executes various threads of the concurrent program and checks for concurrent accesses to a target variable. By nondeterministically choosing from the various threads at many points, the sequential program is able to emulate many executions of the original concurrent program, and can catch many of its inherent data race errors.

Figure 1A:
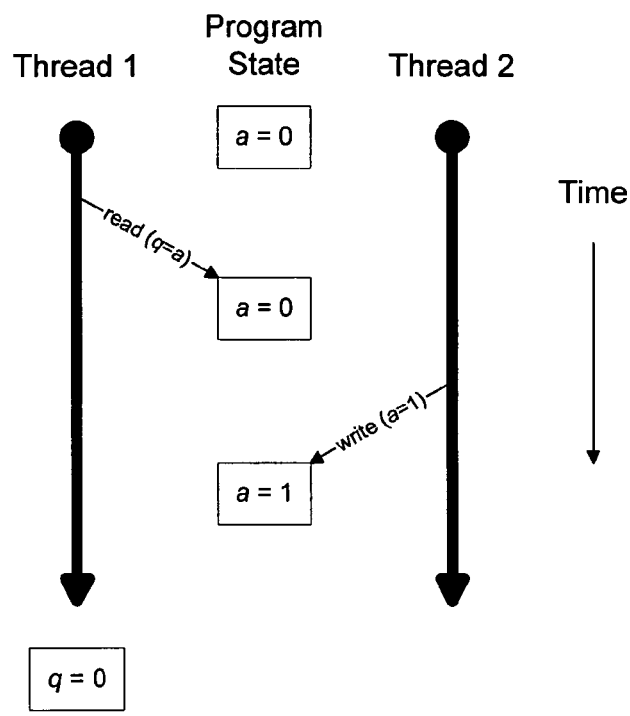
FIGS. 1a-1d illustrate examples of races between two threads of a multithreaded program.
Figure 1B:
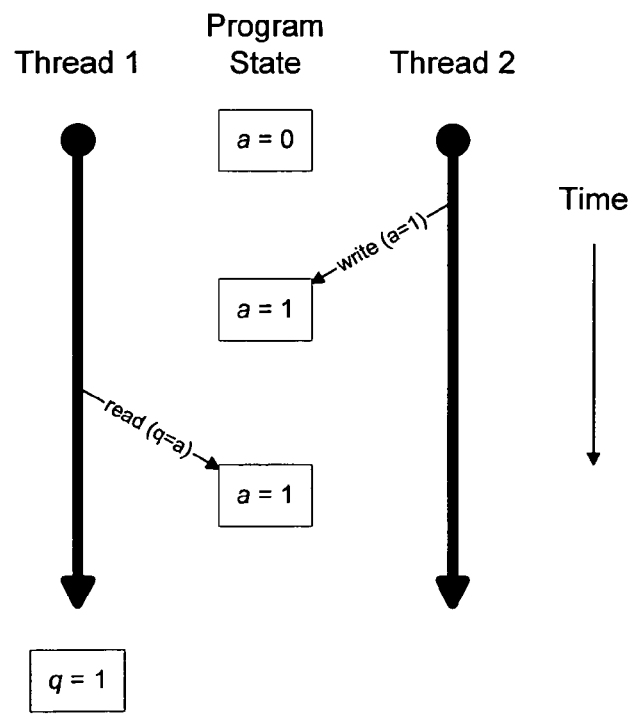
Figure 1C:
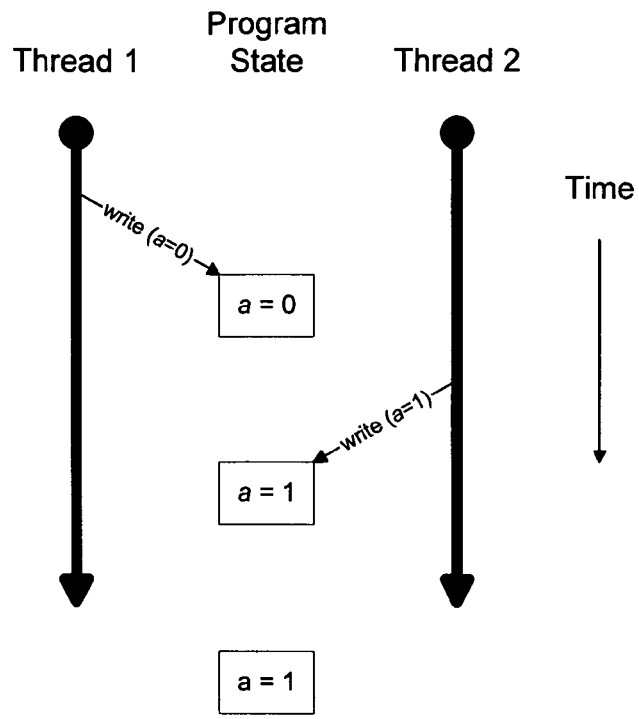
Figure 1D:
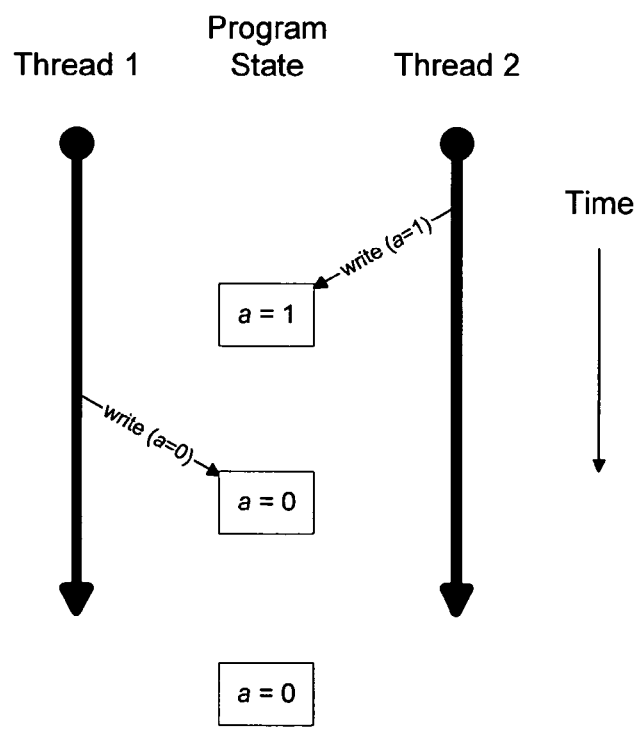
Figure 2:
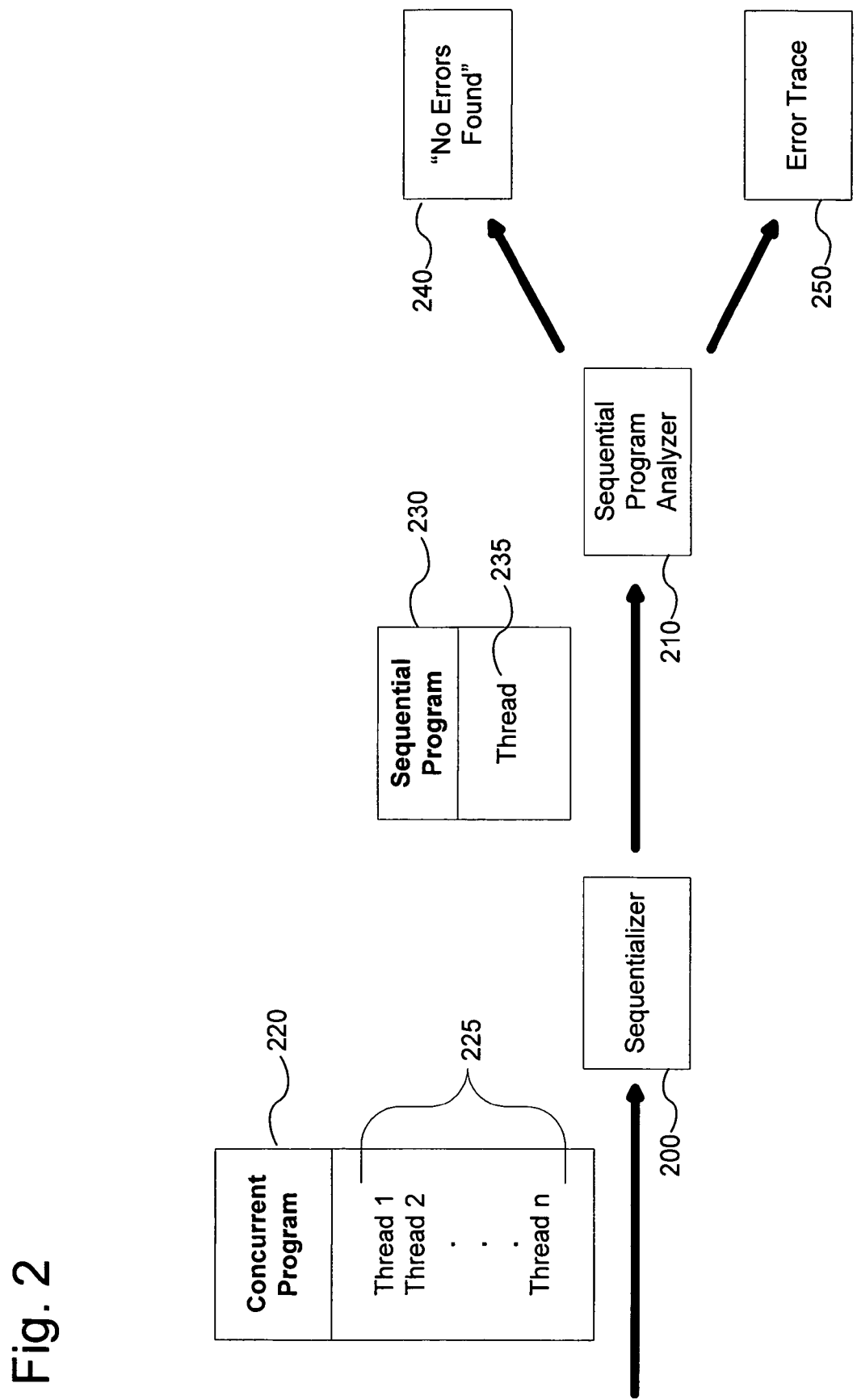
FIG. 2 is a block diagram of a system for performing data race detection on a multithreaded program using a sequential program analyzer.

FIG. 2 illustrates one embodiment of a system for using sequential program analysis to analyze a concurrent program. In the illustrated embodiment, two software components are shown, a sequentializer module 200 and a sequential program analyzer 210. In one embodiment, these modules are maintained separately; examples include, but are not limited to, stand alone applications, separate dynamically-linked libraries, or software modules combined in larger applications. In another embodiment, the modules 200 and 210 are combined to run in a single application. In some embodiments, as described below, the sequentializer module 200 may take the form of a library or plug-in that is used by the sequential program analyzer 210 in order to perform the analysis. In another embodiment, the sequential program analyzer is created independently from the sequentializer or is created by a third party without being specially adapted for the sequentializer.

In the illustrated embodiment, a concurrent program 220, containing multiple threads 225 is received by the sequentializer in order that it may be analyzed. In the illustrated embodiment, the sequentializer 200, upon receiving the concurrent program 220, creates a sequential program 230 containing a single thread 235. This program is created based on the concurrent program 220 and in one embodiment is created according to the method described below with respect to FIGS. 4, 5, and 6. Additionally, the creation of the sequential program 230 is done in reference to a single variable, adding instrumentation which allows the sequential program analyzer 210 to check for data races on that variable by checking assertions. In an alternate embodiment, instrumentation is added to provide analysis for multiple variables. In one embodiment, the concurrent program 220 and the sequential program 230 are in the form of source code. In various other embodiments, the programs take the form of machine code, abstract syntax trees, or control-flow graphs. In one embodiment, the threads 225 of the concurrent program 220 are in the form of functions which are configured to run asynchronously.

Once the sequential program 230 is created, it is given to the sequential program analyzer 210 for analysis. In the illustrated embodiment, one of two results then occurs, the sequential program analyzer 210 either creates in indication 240 that there are no errors in the program or it produces an error trace 250 which indicates the location and type of error(s) in the sequential program 230. The information located in the error trace 250 can then be used to locate a problem in the original concurrent program 220.

2. Sequential Program Structure

Figure 3:
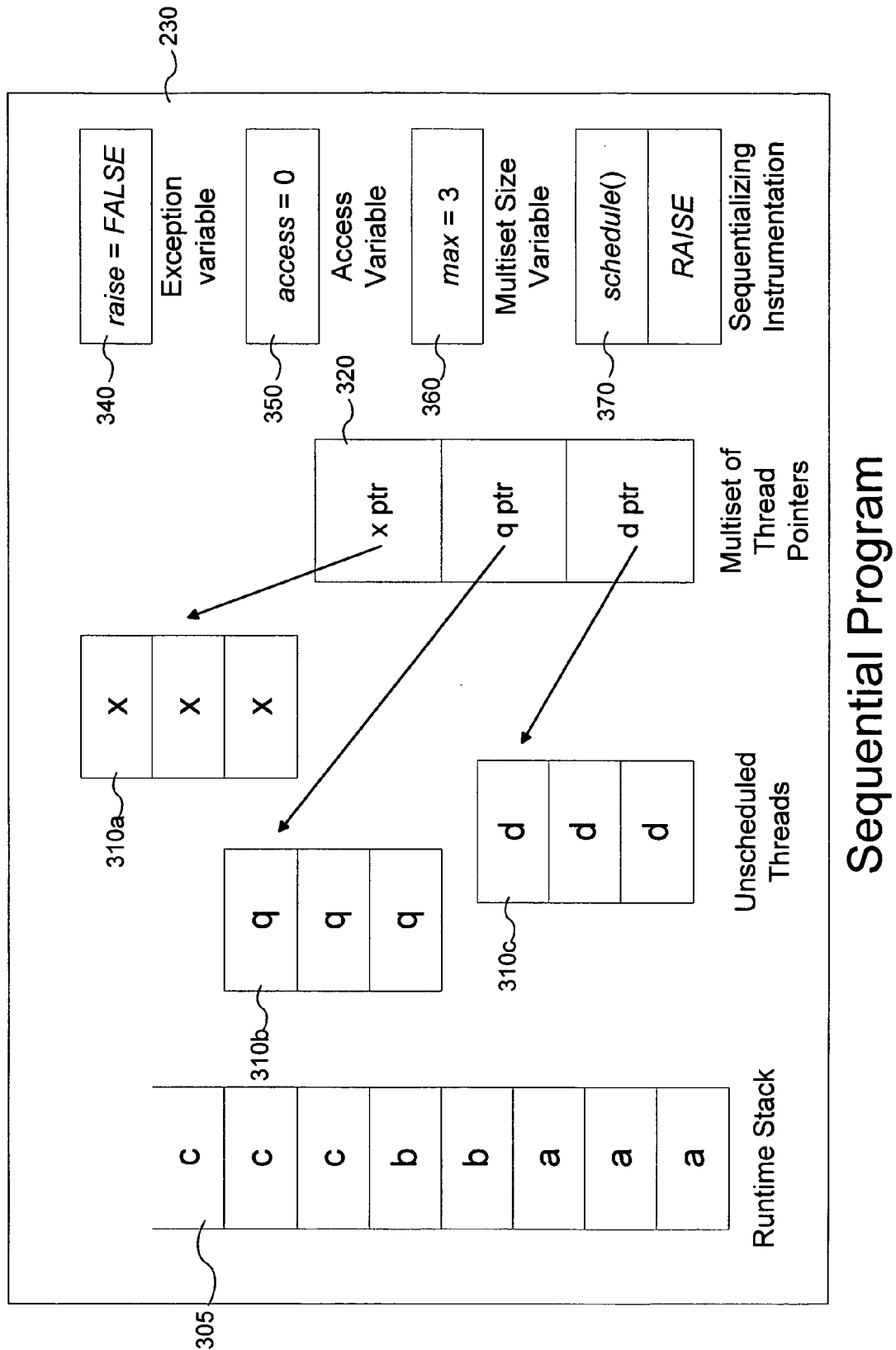
FIG. 3 is a block diagram of components of one embodiment of the sequential program of FIG. 2.

FIG. 3 is a block diagram illustrating, in one embodiment, the components of a sequential program 230, created by the sequentializer 200. The illustrated embodiment shows an example of a sequential program 230 during execution. Function code and variables that exist in the concurrent program are transferred to the newly-created sequential program, but are not illustrated for the sake of clarity of the illustration. In the illustrated embodiment, the sequential program 230 contains a single runtime stack 305. While concurrent programs can have runtime stacks for each concurrently-running thread, a sequential program will only have one stack. In one embodiment, this runtime stack contains various functions, both asynchronous and synchronous, that are contained in the concurrent program from which the sequential program 230 is created. In the illustrated example, threads a, b, and c have been scheduled on the runtime stack.

In the illustrated embodiment, the sequential program also contains unscheduled threads 310a-c, each of which is pointed to by a pointer in the multiset of thread pointers 320. Each of the threads 310a-c has been created during the execution of the program by an asynchronous function call. In a typical concurrent program, the threads would run on their own runtime stacks. However, because there is only a single runtime stack 305, the threads must remain unscheduled until the program schedules them and pushes them onto the runtime stack 305. In one embodiment, the multiset is a data structure that allows access to any thread pointer it contains regardless of when or from where the pointer's thread was forked. This allows for a nondeterministic scheduling of the various forked threads. In other embodiments, restrictions may be placed on the order in which threads are scheduled in the sequential program.

Additionally, in the illustrated embodiment, the sequential program 230 contains three global variables which are added to the concurrent program on which the sequential program is based. The first is the exception variable 340, referred to in the illustrated embodiment as raise. This is a boolean variable which, when set, causes a function to remove itself from the runtime stack. As will be described below, the exception is normally set to FALSE. However, if the sequential program 230 sets the exception variable to TRUE this will cause the immediate removal from the runtime stack 305 of every function in a thread (of the concurrent program 320), until the entire thread is removed. This is similar to the throwing of an exception in some languages. The removal of a function from the stack is performed in order to mimic the transfer of execution instructions from one thread to instructions from another, as happens in a concurrent program.

The second added global variable in the illustrated embodiment is the access variable 350, referred to in the illustrated embodiment as access. This is a variable which tracks the current state of access of a targeted variable. In one embodiment, assertions are inserted into the sequential program which set the access variable depending on the type of access the program is performing at a given time. In the illustrated embodiment, the access variable is set to 0, which means that the program is not in a state where the targeted variable is being accessed. In one embodiment, the access variable 350 can take a value of 1 if the targeted variable is being read by a thread, and a value of 2 if the targeted variable is being written to. In alternate embodiments, other values or methods of recording the current access to the target variable are used.

The third added global variable in the illustrated embodiment is the multiset size variable 360 which limits the size of the multiset 320. This variable parameterizes the analysis of a concurrent program, reducing or increasing the complexity of the sequential program by limiting the number of unscheduled threads which can be held in the multiset before being scheduled. In one embodiment, the multiset size variable 360 is set by a user at the time the analysis is done. In another embodiment, the variable is set to a default value.

In the illustrated embodiment, the sequential program 230 also contains sequentializing instrumentation 370, which includes the schedule( ) function and the RAISE macro statement. As will be explained below, this instrumentation allows the sequential program to nondeterministically schedule the various unscheduled threads 310a-c on the runtime stack 305 and to nondeterministically remove scheduled threads from the stack, emulating multiple executions of the concurrent program from which the sequential program 230 was created.

3. Creating a Sequential Program

Figure 4:
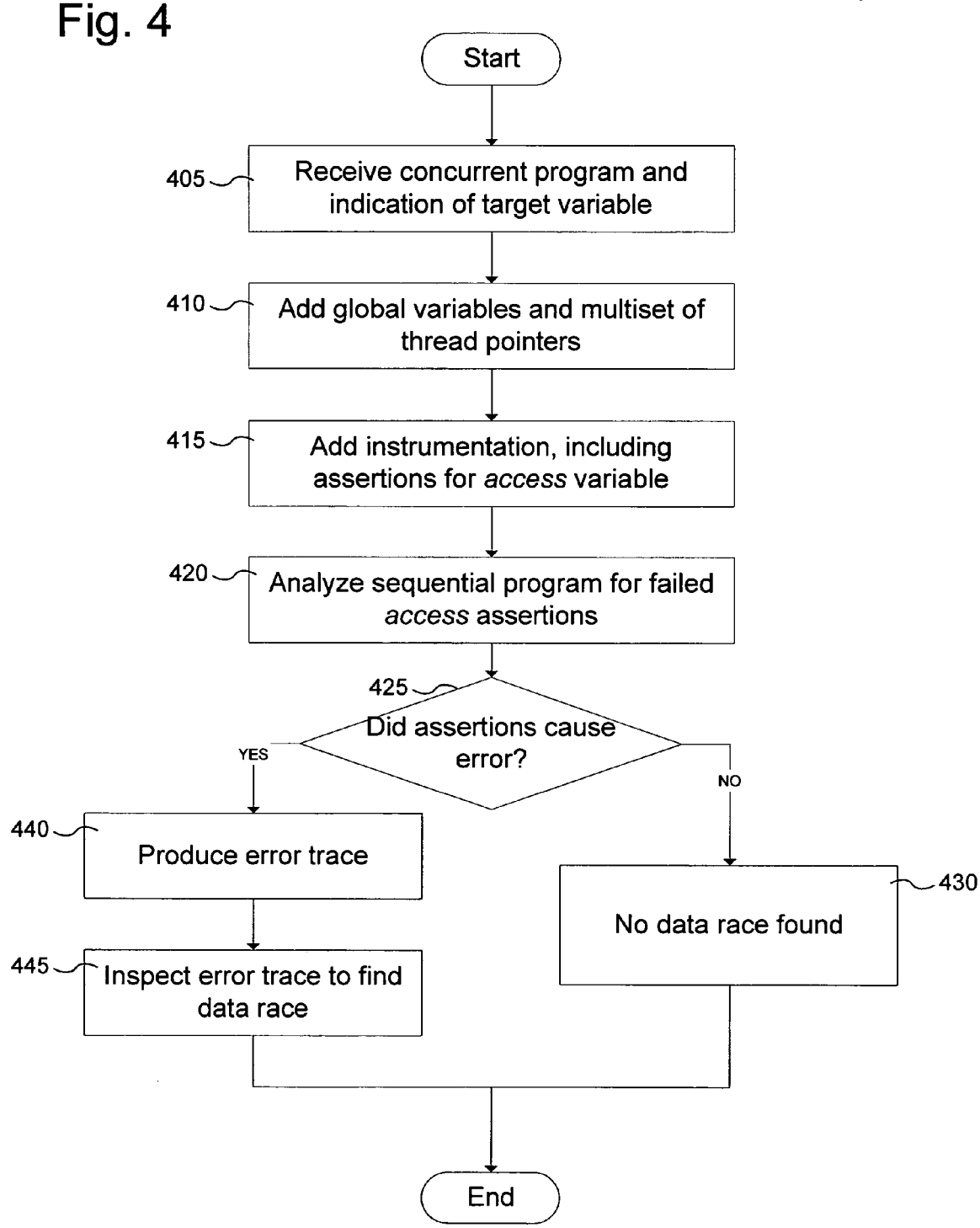
FIG. 4 is a flow diagram of one embodiment of a process of creating a sequential program from a multithreaded program.

FIG. 4 is a flow diagram of one embodiment of a process performed by the sequentializer 200 and the sequential program analyzer 210 for creating and testing the sequential program 230 of FIG. 2. At block 405, the process begins by receiving a concurrent program and an indication of the target variable for which data race analysis will be performed. As mentioned above, the received concurrent program, in one embodiment, is source code, while in other embodiments the received program is partially-compiled before being sequentialized and is in the form of an abstract syntax tree or control flow graph. After receiving a concurrent program, at block 410 code for the global exception, access variables 340 and 350 and the thread pointer multiset 320 are added to the concurrent program code. At block 415, instrumentation is then added to the concurrent program code to cause it to perform as a sequential program and to create assertions about the global access variable which, if violated, will denote the presence of a data race. The process of adding instrumentation is described in greater detail below with respect to FIG. 5 and in one embodiment is performed for every function in the concurrent program. Once the instrumentation is added, the process proceeds to block 420 where the sequential program 230 is analyzed using the sequential program analyzer 210 to determine if any of the added assertions failed. At decision block 425, the process checks for an error from the sequential program analyzer 210. If no error is found, the process, at block 430, reports that no data race is found. If, however, an error is discovered because one of the added assertions failed, the process proceeds to block 440, where an error trace is formed. Next, at block 445, the error trace may be analyzed to determine exactly which assertion created the error, and thus, which execution of the concurrent threads in the concurrent program would cause a data race.

4. Adding Instrumentation

Figure 5:
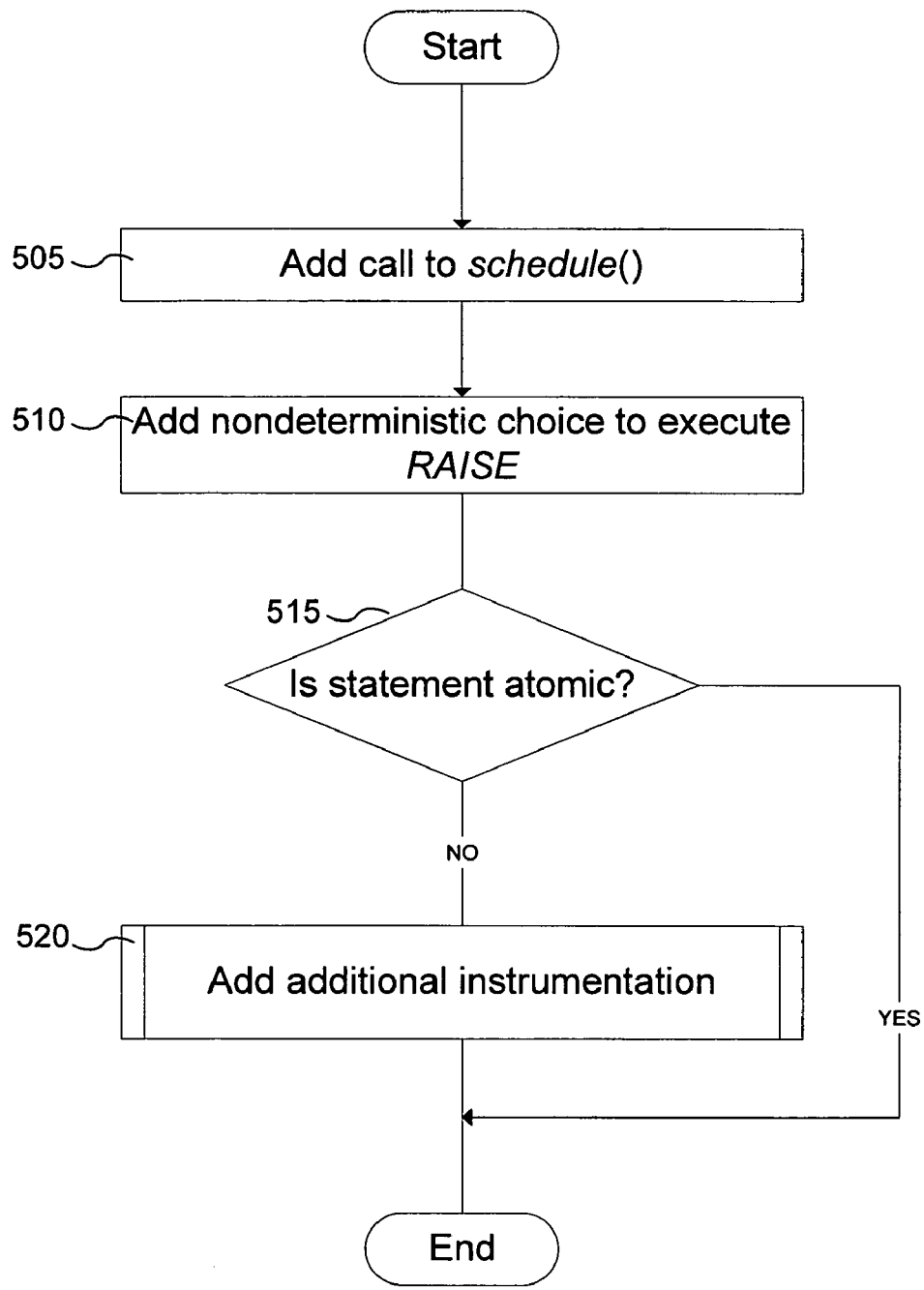
FIG. 5 is a flow diagram of one embodiment of a process performed by the sequentializer of FIG. 2 for adding instrumentation to a statement from a concurrent program.

FIG. 5 is a flow diagram illustrating, in one embodiment, a process performed by the sequentializer 200 for adding instrumentation to a statement of a concurrent program. In one embodiment, the process of FIG. 5 is performed for each statement in the concurrent program which changes the state of the program. In other embodiments, the process of FIG. 5 may be applied only to preselected types of statements. The instrumentation is to cause, in a preferred embodiment, the resulting sequential program to nondeterministically schedule threads on its single runtime stack, to nondeterministically force threads to remove themselves from the stack while they are operating, and to nondeterministically create assertions before the target variable is read or written too. In this manner, a large number of executions of the concurrent program 220 can be simulated by the sequential program 230 and various accesses to the target variable in each execution can be checked for a data race.

Beginning at block 505, the sequentializer 200 adds a call to the schedule( ) function of the sequentializing instrumentation 370. As mentioned above, the schedule( ) function, along with the RAISE macro, allows the sequential program to nondeterministically schedule and remove threads from the runtime stack, emulating multiple executions of a concurrent program. The schedule( ) function in particular is configured to schedule unscheduled threads on the runtime stack 305 a nondeterministic number of times each time it is called. This helps the sequential program emulate many different executions of threads that are forked in the concurrent program. In one embodiment the schedule( ) is associated with helper functions put( ) and get( ), which add and remove forked thread pointers to the multiset of thread pointers 320, respectively. In one embodiment, in order to emulate as many executions as possible, the get( ) function nondeterministically chooses a function from the multiset of thread pointers 320. In an alternative embodiment, the functions put( ) and get( ) are replaced with direct access to the multiset of thread pointers 320.

One embodiment of a simplified version of the schedule( ) function, given in a C-style language, is as follows:

```
schedule( ) {
    var f;
    iter {
        f = get( );
        f( );
        raise = FALSE;
    }
}
```

In this code example, the keyword iter represents iteration of its block a nondeterministic number of times. Thus, in one embodiment, every time schedule is called it will schedule a nondeterministic number of threads on the runtime stack 305. This nondeterministic number can be anywhere from 0 to the number of threads present in the program, so long as get( ) is able to find a new thread. After each thread is scheduled and returns, schedule( ) also sets the raise flag to FALSE in case the thread was returned because the raise variable was set. In alternate embodiments, the schedule( ) function is not added as source code, but as changes to a control flow graph, an abstract syntax tree, or as machine code.

Continuing to block 510, the sequentializer 200 then adds a nondeterministic choice to execute the RAISE macro. In one embodiment, shown in the instrumentation examples of FIG. 7, this is performed by including a choice command which creates a nondeterministic choice for the sequential program between executing RAISE or doing nothing. In one implementation, RAISE is a compiler-inlineable macro statement defined as:

RAISE={raise=TRUE; return}

Because the raise flag is set when the statements of the RAISE macro are executed, each function in the currently-executing thread will return until the entire thread is removed from the runtime stack 305, at which point the schedule( ) function, which scheduled the returned thread in the first place, will set the raise flag to FALSE and nondeterministically schedule another thread or allow execution to continue with the last thread pushed on the stack. In one embodiment, RAISE is referred to as an exception macro, as it simulates the action of throwing an exception in languages that recognize exception throwing.

Next, at decision block 515, the sequentializer 200 determines if the statement for which instrumentation is being added is an atomic statement. In one embodiment, this is a statement which will not allow another thread to interrupt during its execution, in order to prevent concurrent execution problems. Because statements that are atomic cannot give rise to different executions, there is no need to further instrument the statement and the process ends. If, however the statement is not atomic, it may be interrupted during its execution, and additional instrumentation is helpful. Thus, at block 520 the additional instrumentation is added. This is described in further detail with respect to FIG. 6.

Figure 6:
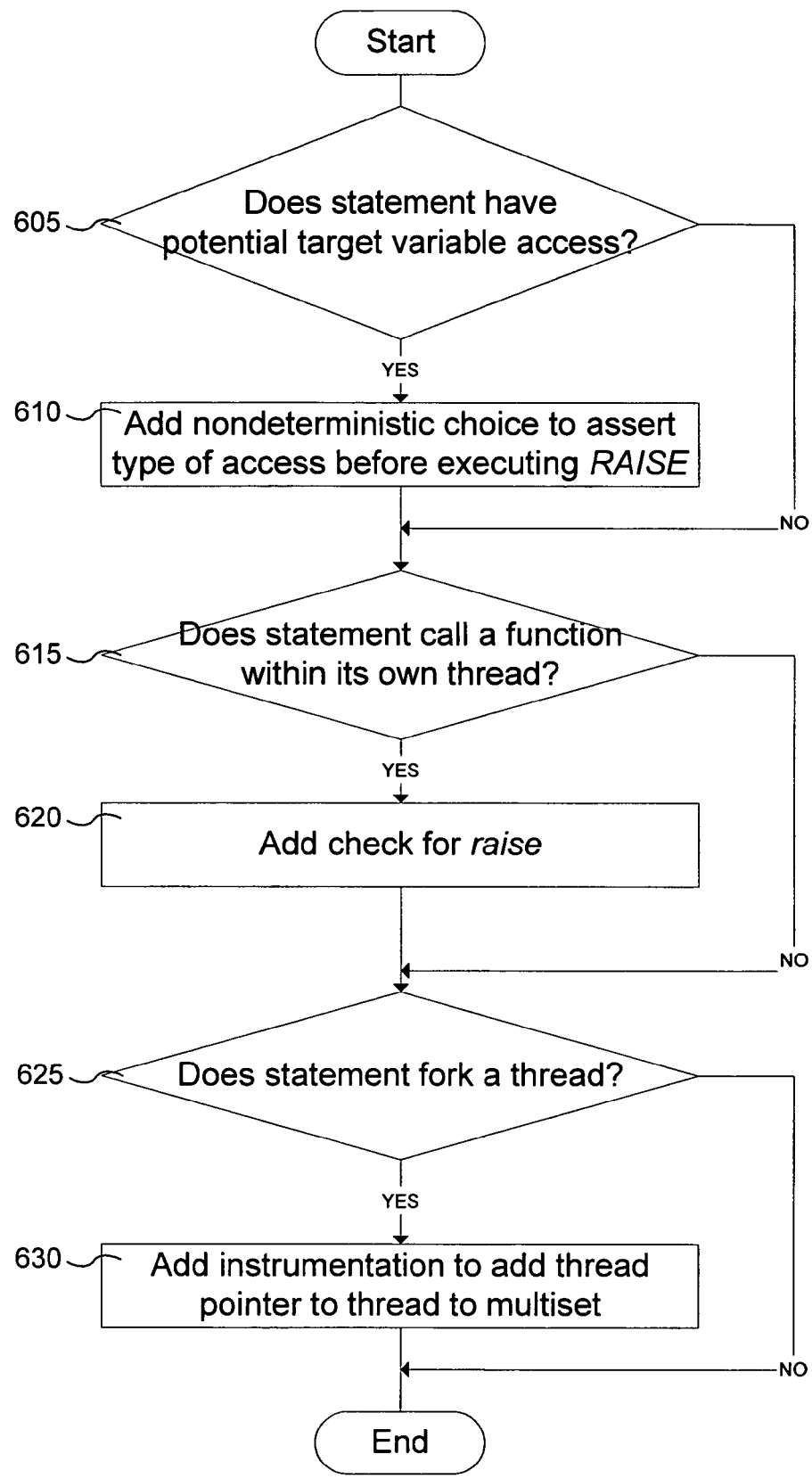
FIG. 6 is a flow diagram of one embodiment of a process performed by the sequentializer of FIG. 2 for adding instrumentation to a non-atomic statement from a concurrent program.

FIG. 6 is a flow diagram illustrating, in one embodiment, a process of the sequentializer 200 for adding additional instrumentation to a non-atomic statement. The process starts at decision block 605, where the sequentializer determines if the statement potentially accesses the target variable. In one embodiment, this access includes either a read or a write. In one embodiment, this is done by checking for any writes or reads from variable pointers. In another embodiment, pointer analysis is performed to determine which pointers cannot refer to the target variable, and these variable pointers are ignored for the purposes of decision block 605. In one embodiment, the pointer analysis is performed for all variable pointers at the beginning of the data race analysis; in another embodiment, pointer analyses are performed at the time of instrumentation.

If there is no potential target variable access, the sequentializer 200 continues to decision block 615. If, however there is potential target variable access, the sequentializer continues to block 610 where it adds one or more nondeterministic choices to include an assertion about the type of access being performed before executing the RAISE macro. In one embodiment, these assertions and the RAISE execution are added to the code of the sequential program before the actual target variable access can take place. In another embodiment, if more than one potential target variable access is contained in the statement being instrumented, then multiple assertions are added, one for each type of access, such that a nondeterministic choice exists for each one of them. The assertions have two purposes. The first is to set the global access variable in order to indicate that a particular type of target variable access is about to take place. The second is to assert what the status of the access variable should be before a target variable access. This assertion, if it is incompatible with current state of the access variable, will then cause the sequential program analyzer to indicate an error, which further indicates the presence of a data race.

In one embodiment, different assertion functions exist for reading and writing to the target variable. One embodiment of a simplified reading assertion for a target variable r, given in a C-style language, is as follows:

```
check_r(v) {
    if (v == &r)
        {assert(access ≠ 2); access = 1;}
}
```

Similarly, one embodiment of a simplified writing assertion is as follows:

```
check_w(v) {
    if (v == &r)
        {assert(access == 0); access = 2;}
}
```

In the embodiments listed above, the checking functions receive function pointers which are checked against the target variable. In an alternate embodiment, the checking functions check variables instead of pointers. In both of the simplified checking functions, the variable pointer is first checked to see if it is currently referring to the target variable. If so, then assertions are made about access to check any current access that may be going on with respect to the target variable. In the case of the reading checking function $check_r(\ )$, the function asserts only that there is not a write going on. In the case of the writing checking function $check_w(\ )$, the function asserts that there is neither a read nor a write going on. If the assertions take place without creating errors, then the checking functions set access to indicate the type of target variable access that is about to take place. Then, continuing in block 610, the RAISE macro is executed before the actual target variable access is performed.

It is these checking functions, followed by an immediate execution of RAISE that, in one embodiment, do the work of locating data races in the concurrent programming. By setting the value for access and then immediately removing the entire thread from the runtime stack 305 through an execution of RAISE, the instrumentation emulates the interruption of the thread that has just set the value for access with whichever thread is nondeterministically scheduled next. And if this thread contains an access to the target variable which would create a data race, its checking function will cause an error when it attempts to assert an incorrect value for access. It is by nondeterministically choosing many different accesses and thread scheduling orders that the sequential program is able to search for many of the potential data race problems that might exist. Examples of the checking functions can be found below, with respect to FIG. 7.

The sequentializer 200 then continues to decision block 615, where it determines if the statement calls another function within its own thread. If the statement does not call a function in its own thread, the sequentializer continues to block 625. If, however, the sequentializer determines that the statement is calling a function in its own thread, the sequentializer, at block 620, adds a check to see if the raise variable is set when the called function returns. If the raise variable is set, the calling function immediately returns itself. In one embodiment, it is these added raise checks that cause an entire thread to return function-by-function and remove itself from the runtime stack 305 when the RAISE macro is executed. An example of the check added in block 620 can be found below in entry 735 of FIG. 7.

Continuing to decision block 625, the sequentializer 200 then determines if the statement forks a new thread. If not, the process of FIG. 6 ends and no more instrumentation is added. If so, instrumentation is added that adds a pointer to the newly-forked thread to the multiset of thread pointers 320 (block 630). In one embodiment, this is performed by checking to see if the size of the multiset 320 has reached the size of the multiset size variable 360. If so, the thread is simply scheduled immediately. If not, a pointer to the thread is then added to the multiset 320, so that it can be nondeterministically scheduled by the sequential program 230.

FIG. 7 lists examples of instrumentation that, in one embodiment, are added to code of the concurrent program 220 to create the sequential program 230. In the illustrated embodiment, the left column denotes statements that are contained in the concurrent program, and the right column denotes instrumented statements for the sequential program. While the illustrated embodiment utilizes source code manipulation, alternate embodiments act on abstract syntax trees, control-flow graphs, or compiled code. Additionally, while a C-style language is used in these examples, other embodiments exist for other languages and programming environments. In the illustrated embodiment, the keyword choice{ } is used to represent a nondeterministic choice between two or more sets of instructions, the sets separated by "[ ]." The keyword skip, used in the illustrated embodiment as one of the nondeterministic choices, denotes continuing on to the next instruction, in essence skipping the nondeterministically-chosen options. Other embodiments may use different terminology or keywords to implement nondeterministic choices with the option of doing nothing.

In one embodiment, certain characteristics are shared by many or all of the different listings. Each of the instrumented sequential code examples 705-745 contain a call to schedule( ) before any other instructions. As was mentioned above, the repeated call to schedule( ) allows nonscheduled threads to nondeterministically interrupt the operation of the current thread, thus adding this instrumentation helps the sequential program 230 emulate the various operations of the concurrent program 220. Additionally, listings 705-745 each contain the nondeterministic choice { } keyword with at least one of the options including an execution of RAISE. Again, for each instrumented statement, this allows the sequential program to emulate the current thread by nondeterministically getting interrupted before executing the original instruction. The one example that does not include an execution of RAISE, listing 745, does not have any executable instructions besides return. Thus, it is not useful in the illustrated embodiment to execute the RAISE macro at that point. In other embodiments, RAISE may be executed before every statement.

Listings 705 and 710 illustrate instrumentation of simple assignment statements. In each, there is a nondeterministic option to make a $check_w(\ )$ call before executing RAISE. Because both 705 and 710 are assignment statements, $check_w(\ )$ is used to ensure that writing to the value v does not cause a data race on the target variable. Additionally, in both 705, where a variable v is set to a constant c, and 710, where a variable pointer v is set to the address of a variable $v_1$, there is no reading of the value of a variable, thus there is no call to $check_r(\ )$.

Contrasting these simple statements are the more complex statements given in the listings 715, 720, and 725. In each of the original statements for these listings, either a variable's value or the value that it points to is being read. In addition, there are still assignments to variables or to values being pointed to by variables. Thus, the nondeterministic choice { } includes a $check_r(\ )$ or a $check_w(\ )$ for each variable value accessed, followed by a RAISE, giving rise to more nondeterministically-chosen executions of the sequential program. This nondeterministic branching effect is useful because data races can occur on any of the variables, or values that variables point to.

Listing 730 illustrates that, in one embodiment, an atomic statement contains no further instrumentation than a call to schedule( ) and an execution of RAISE. This corresponds to the decision made in decision block 515 to forego further instrumentation on atomic statements.

Listing 735 illustrates one embodiment of the instrumentation of a function call. In addition to the call to schedule( ) and the nondeterministic choice{ }, the sequential code is further instrumented with the instruction "if (raise) return," which, as mentioned in the discussion above with respect to block 620, allows each function in a currently-executing thread to return if RAISE sets the raise flag. Additionally, although the call to $v_0(\ )$ is left in the instrumented code, the statements of the function $v_0(\ )$ are typically also instrumented.

Listing 740 illustrates, in one embodiment, an asynchronous call to a function. In the concurrent program, this call would create a new thread. As mentioned above with respect to block 630, the instrumentation adds a pointer to the newly-forked thread to the multiset of thread pointers 320.

Thus, the added instrumentation first checks, using a size( ) helper function which reports the number of thread pointers in the multiset, if the multiset has space, i.e. whether the current size of the multiset has reached the global multiset size or not. If there is room, the thread is added to the multiset to be nondeterministically scheduled, and if not, the thread is immediately scheduled by calling the pointer to the thread. In the case that the thread is immediately scheduled, an instruction to set raise to FALSE is added, in case the scheduled thread later returns due to to an execution of RAISE. As mentioned above, besides instrumentation adding these calls to the $v_0$( ) function, the statements of the function itself are instrumented as well. As mentioned above, listing 745, an instrumented return statement, contains only an added call to schedule( ) because, in the illustrated embodiment, execution of RAISE would be superfluous.

5. Example Operation of a Sequential Program

FIGS. 8a-8f illustrate one embodiment of an exemplary operation of a sequential program 230 for a single exemplary execution with a target variable v. In one embodiment, this execution is simulated by the sequential program analyzer 210 while it performs the process of block 420 and checks for failed assertions in the sequential program. In FIGS. 8a-8f, the left column illustrates instructions currently being executed as the execution proceeds. The center column illustrates the current state of the runtime stack 305 after the instructions are executed, and the right column illustrates the status of the global access variable. While the example of FIGS. 8a-8f show only one execution, in one embodiment, the execution would be one of numerous nondeterministically-chosen executions for the sequential program 230.

Figure 8A:
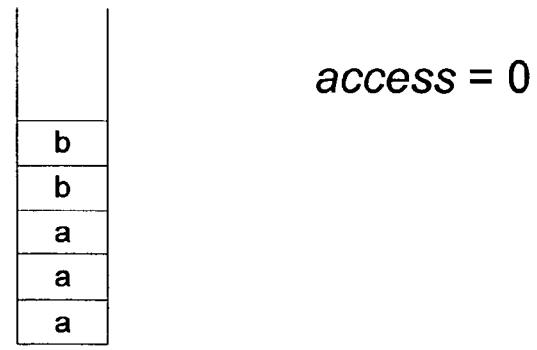
Figure 8B:
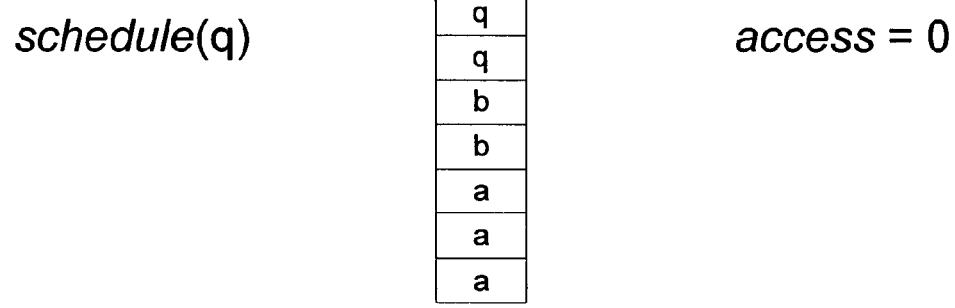

In FIG. 8a, two threads, a and b, have been pushed onto the runtime stack, with b currently executing. At the point in time represented in FIG. 8a, no access has yet been made to the target variable, so access currently has value 0. Next, in FIG. 8b, a call to schedule( ) is made and the schedule( ) function nondeterministically chooses to schedule thread q onto the runtime stack 305. As no access has yet been made to the target variable, access remains at 0. Next in FIG. 8c, another call to schedule( ) is made and the schedule( ) function nondeterministically chooses to schedule thread x onto the runtime stack.

Figure 8C:
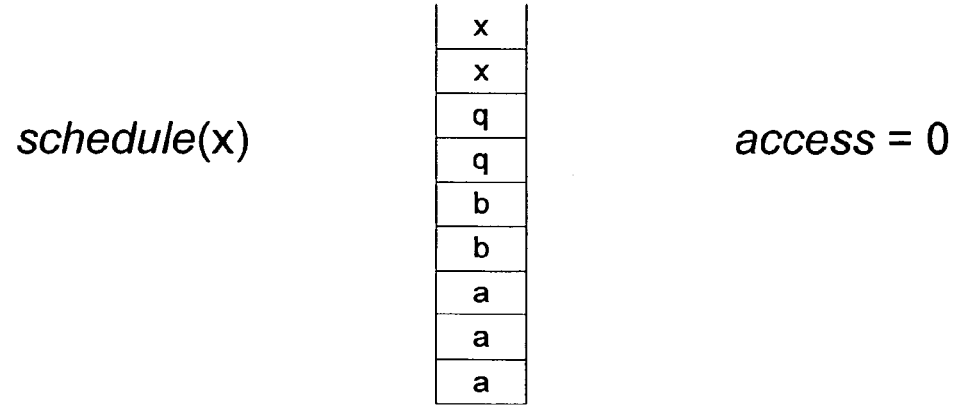

In FIG. 8d, the sequential program 230, while executing thread x, executes the instruction "v=5." Thus, by the instrumentation discussed above, the program is offered, among other nondeterministic choices, a choice to invoke the $check_w(v)$ function and then execute RAISE. The example of FIGS. 8c-8d illustrates an example where that choice is made, and so access is set to 2 to indicate that a write is taking place, and the thread x is removed from the runtime stack.

Next, in FIG. 8e, schedule( ) is again invoked and it nondeterministically chooses to schedule thread p on the runtime stack. The access variable remains at 2 in order to check for any other accesses of the target variable that may result out of this particular execution. Finally, in FIG. 8f, the sequential program, while executing thread p, executes the instruction "m=v." Because this involves a reading of the value of v, a nondeterministic choice to invoke $check_r(v)$ and then RAISE is made. And because $check_r(v)$ makes an assertion that access is not equal to 2, the assertion will fail. This failure, when noticed by the sequential program analyzer will produce an error trace, which, when studied, will report the particular thread scheduling and instructions that lead to the failed assertion. This, in turn, will isolate the data race created by the threads x and p.

In one embodiment, because of the nature of the instrumentation, in particular the location of calls to schedule( ) and executions of RAISE, a sequential program created from a concurrent program by the process above will not necessarily emulate every possible execution of the concurrent program. However, because instrumentation is added before every state-changing statement in the concurrent program, a large number of executions are emulated.

Formally, if every thread in a given concurrent program is given a unique identifier in the set $N=\{1, 2, \ldots\}$, then for any finite set $X \subseteq N$, a language $L_x \subseteq N$ can be defined whose strings can represent possible executions of a sequential program created from that concurrent program. The language is defined recursively by:

$$L_x = \{i^* \cdot L_{x_j} \cdot K \cdot i^* \cdot L_{x_k} \cdot i^* | \{i\}, X_1, K, X_k \text{ form a partition of } X\}$$

Thus, given an execution of the threads of a sequential program created by the above process with an unbounded multiset of thread pointers, and labeling the threads by their unique identifiers, there is a string in $L_x$ which matches the labeling of the execution of the program. This also means that if the labeling of an execution of a concurrent program would not match a string in $L_x$, then it will not be emulated by the process described above.

6. Computing Environment

The above described sequentializer 200 and sequential program analyzer 210 (FIG. 2) can be implemented on any of a variety of computing devices and environments, including computers of various form factors (personal, workstation, server, handheld, laptop, tablet, or other mobile), distributed computing networks, and Web services, as a few general examples. The data race detection using sequential program analysis can be implemented in hardware circuitry, as well as in sequentializer software 200 and sequential program analyzer 210 executing within a computer or other computing environment, such as shown in FIG. 9.

Figure 9:
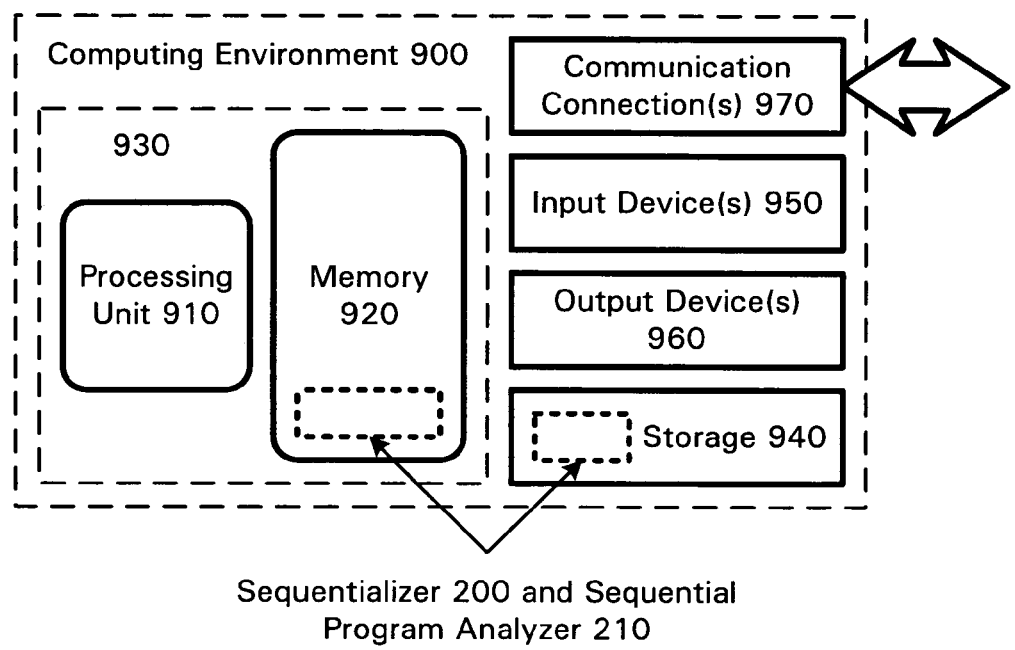
FIG. 9 is a block diagram of a suitable computing environment for implementing the system of FIG. 2.

FIG. 9 illustrates a generalized example of a suitable computing environment 900 in which the described techniques can be implemented. The computing environment 900 is not intended to suggest any limitation as to scope of use or functionality of the invention, as the present invention may be implemented in diverse general-purpose or special-purpose computing environments.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. The memory 920 stores software 980 implementing the sequentializer 200 and the sequential program analyzer 210.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. The storage 940 stores instructions for the sequentializer 200 and the sequential program analyzer 210.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "emulate", "determine," "indicate," and "execute," to describe computer operations in a computing environment. These terms are high-level abstractions for operations performed by a computer, and should not be confused with acts performed by a human being. The actual computer operations corresponding to these terms vary depending on implementation.

While preceding embodiments are directed toward the detection of data races, alternate embodiments utilize the sequentializing tool for non-data race debugging and/or other analysis of concurrent programs. Because the sequential program non-deterministically emulates multiple executions of the input concurrent program, debugging can be performed for error conditions other than data races which result from concurrently-executing threads. In one such alternate embodiment, debugging is performed for checking of an assertion existing in the concurrent program before the program is sequentialized.

One example of such an assertion is for a stopping flag designed to halt execution of threads in a device driver. Use of the sequentializing tool allows executions resulting in improper violations of the stopping flag assertion to be located by a sequential program analyzer. Because the sought-after bug is in assertion conditions, the debugging in this instance may be made without the addition of any new assertions. Thus, in some embodiments, debugging of certain conditions may be made through sequentializing alone. Other examples of assertions which can be checked through use of the sequentializer include, but are not limited to, assertions on flags or semaphores controlling thread execution order, access permissions for database entries, variables, or files, or network access.

In view of the many possible embodiments to which the principles of our invention may be applied, we claim as our invention all such embodiments as may come within the scope and spirit of the following claims and equivalents thereto.

We claim:

1. A computer comprising one or more computer-readable media and a processor, the computer-readable media containing instructions, which, when executed by the processor on the computer, cause the computer to perform the actions of a system for detecting a data race in a multithreaded concurrent program, the system comprising:
   a program sequentializer module configured to receive code for a concurrent program as input and create as output a single-threaded sequential program utilizing a single run-time stack having assertions;
   wherein, when the sequential program is analyzed by a program analyzer, the assertions cause an error message to be produced by the program analyzer when the concurrent program contains a data race;
   wherein the program sequentializer module is further configured to add data structures to the received code, the added data structures at least comprising:
      a multiset of thread pointers which comprises pointers to threads which have been created but have not yet been scheduled on the runtime stack; and
      a global boolean exception variable which, when set, causes the single-threaded sequential program to remove from the runtime stack the currently-executing thread.

2. The computer of claim 1, wherein the system further comprises a sequential program analyzer module which analyzes the single-threaded sequential program and produces error messages if assertions are not met and wherein the assertions are created to be checked by the sequential program analyzer.

3. The computer of claim 1, wherein:
   the multiset of thread pointers is limited to a maximum number of pointers; and
   the added data structures further comprise a global multiset size variable, which indicates the maximum number of pointers.

4. The computer of claim 1, wherein:
   the program sequentializer module is further configured to receive an indication of a target variable which will be analyzed for data races; and
   the added data structures further comprise a global access variable which indicates, for the analyzed target variable, the current type of access being requested of the analyzed target variable.

5. The computer of claim 4, wherein the program sequentializer module is further configured to insert instrumentation into the received code, the instrumentation at least comprising:
   a scheduling function which selects a thread pointer from the multiset and schedules the thread indicated by the pointer on the runtime stack;
   an exception macro which sets the global boolean exception variable and causes an executing thread to be removed from the runtime stack;

a read-checking function, which checks to see that the global access variable does not indicate that the target variable is being written to and then sets the global access variable to indicate that the target variable is being read from; and a write-checking function, which checks to see that the global access variable does not indicate that the target variable is being read from or written to and then sets the global access variable to indicate that the target variable is being written to.

6. The computer of claim 5, wherein the read-checking and write-checking functions contain assertions about the global access variable which can be checked by the sequential program analyzer module.

7. The computer of claim 5, wherein the instrumentation is inserted so that it will execute nondeterministically in the single-threaded sequential program.

8. The computer of claim 1, wherein the single-threaded sequential program output by the sequentializer module is in the form of source code.

9. The computer of claim 1, wherein the single-threaded sequential program output by the sequentializer module is in the form of an abstract syntax tree or a control-flow graph.

10. The computer of claim 1, wherein the code for the concurrent program received by the sequential analyzer is in the form of source code.

11. The computer of claim 1, wherein the code for the concurrent program received by the sequential analyzer is in the form of an abstract syntax tree or control-flow graph.

12. A method of analyzing a concurrent program for data races, the method comprising:
receiving a concurrent program;
receiving at least one target variable to be analyzed for data races; and
creating a single-threaded sequential program utilizing a single runtime stack from the concurrent program, the single-threaded sequential program containing assertions such that, during an analysis of the sequential program, when the assertions are not met, the analysis of the sequential program indicates the presence of a data race in the concurrent program for the target variable;
wherein creating a single-threaded sequential program comprises adding instrumentation and variables to the concurrent program which cause the functions of the concurrent program to be executed sequentially; and
the added variables include:
a multiset of thread pointers which comprises pointers to threads which have been started but have not yet been scheduled on the runtime stack of the sequential program; and
a global boolean exception variable which, when set, causes the sequential program to remove from the runtime stack the currently scheduled thread.

13. The method of claim 12, wherein:
the added variables include:
a global access variable which denotes, for the analyzed variable, the current type of access being requested of the variable.

14. The method of claim 13, wherein the added instrumentation includes:
a scheduling function which selects a thread pointer from the multiset and schedules it on the single runtime stack;
an exception macro which sets the global boolean exception variable and causes an executing thread to be removed from the single runtime stack;
a read-checking function, which checks to see that the global access variable does not indicate that the target variable is being written to and then sets the global access variable to indicate that the target variable is being read from; and
a write-checking function, which cheeks to see that the global access variable does not indicate that the target variable is being read from or written to and then sets the global access variable to indicate that the target variable is being written to.

15. The method of claim 14, wherein the read-checking and write-checking functions contain assertions about the global access variable which can be checked by a sequential program analyzer.

16. The method of claim 14, wherein the instrumentation is inserted so that it will execute nondeterministically in the single-threaded sequential program.

17. A computer-readable storage medium containing instructions which, when executed, cause a computer to perform a method of checking a concurrent program for one or more violations of assertions, the method comprising:
receiving a concurrent program; and
creating a single-threaded sequential program utilizing a single runtime stack from the concurrent program at least in part by adding instrumentation and variables which cause the functions of the concurrent program to be executed sequentially, the sequential program containing assertions such that, during an analysis of the sequential program, when the assertions are not met, the analysis of the sequential program indicates the presence of an error in the concurrent program
wherein the added variables include:
a multiset of thread pointers which comprises pointers to threads which have been started but have not yet been scheduled on the runtime stack of the sequential program; and
a global boolean exception variable which, when set, causes the sequential program to remove from the runtime stack the currently scheduled thread.

18. The computer-readable storage medium of claim 17 wherein the added instrumentation further includes:
a scheduling function which selects a function pointer from the multiset and schedules it on the runtime stack; and
an exception macro which sets the global boolean exception variable and causes an executing thread to be removed from the runtime stack.

* * * * *

UNITED STATES PATENT AND TRADEMARK OFFICE
CERTIFICATE OF CORRECTION

PATENT NO.       : 7,316,005 B2                                       Page 1 of 1
APPLICATION NO.  : 10/765717
DATED            : January 1, 2008
INVENTOR(S)      : Shaz Qadeer et al.

It is certified that error appears in the above-identified patent and that said Letters Patent is hereby corrected as shown below:

In column 16, line 14, in Claim 14, delete "cheeks" and insert -- checks --, therefor.

Signed and Sealed this
First Day of February, 2011

David J. Kappos
*Director of the United States Patent and Trademark Office*